United States Patent
Robinson et al.

(10) Patent No.: US 9,871,974 B2
(45) Date of Patent: Jan. 16, 2018

(54) COMPUTING DEVICE CAMERA VIEW CONTROLLER AND SHUTTER

(71) Applicant: AMX, LLC, Richardson, TX (US)

(72) Inventors: Shaun Robinson, Dallas, TX (US); Miguel Alejandro Sereno, Murphy, TX (US)

(73) Assignee: AMX, LLC, Richardson, TX (US)

( * ) Notice: Subject to any disclaimer, the term of this patent is extended or adjusted under 35 U.S.C. 154(b) by 0 days.

(21) Appl. No.: 14/561,753

(22) Filed: Dec. 5, 2014

(65) Prior Publication Data

US 2016/0165116 A1 Jun. 9, 2016

(51) Int. Cl.
*G03B 11/04* (2006.01)
*H04N 5/235* (2006.01)
*G06F 3/16* (2006.01)
*H04N 5/225* (2006.01)
*H04N 5/63* (2006.01)

(52) U.S. Cl.
CPC .......... *H04N 5/2353* (2013.01); *G06F 3/167* (2013.01); *H04N 5/2252* (2013.01); *H04N 5/63* (2013.01)

(58) Field of Classification Search
USPC ....................................................... 396/448
See application file for complete search history.

(56) References Cited

U.S. PATENT DOCUMENTS

| | | | |
|---|---|---|---|
| 7,436,427 B2 | 10/2008 | Basmadjian et al. | |
| 8,126,720 B2* | 2/2012 | Nakagawa et al. | 704/275 |
| 8,471,956 B2 | 6/2013 | Fortmann | |
| 8,797,451 B2 | 8/2014 | Bilbrey | |
| 2002/0009298 A1* | 1/2002 | Akutsu et al. | 396/319 |
| 2003/0133022 A1* | 7/2003 | Melton | G11B 27/034 348/231.2 |
| 2009/0166430 A1* | 7/2009 | Smith | G06K 19/18 235/491 |
| 2010/0166414 A1* | 7/2010 | Zhang et al. | 396/448 |
| 2011/0037892 A1 | 2/2011 | Hsu | |
| 2011/0262125 A1 | 10/2011 | Wang et al. | |
| 2011/0279897 A1 | 11/2011 | Ohuchi | |
| 2012/0148227 A1* | 6/2012 | Schmit et al. | 396/448 |
| 2013/0088639 A1* | 4/2013 | Mundt et al. | 348/372 |
| 2013/0222609 A1 | 8/2013 | Soffer | |

* cited by examiner

*Primary Examiner* — Minh Phan

(57) ABSTRACT

A camera control device may include a housing to store the camera and various control modules. The housing may also have a movable camera shutter operating on a shutter track that is close to the camera inside the camera housing. The shutter may include an open portion and a closed portion and a knob which extends beyond a surface area of the camera housing to control movement of the shutter along the shutter track. The movement of the shutter may also be automated and may be subject to sensors triggering sensed conditions.

9 Claims, 10 Drawing Sheets

COMPUTING DEVICE CAMERA VIEW CONTROLLER AND SHUTTER

TECHNICAL FIELD OF THE APPLICATION

This application relates to a computing device camera and more specifically to a camera and microphone controller that operates to enable and disable the camera control functions responsive to predefined events.

BACKGROUND OF THE APPLICATION

Conventionally, when a user accesses their computing device, a camera, microphone or a combination of both could essentially be activated at any time as part of that device. Some applications, such as chat applications or video conferencing applications will invoke the camera by enabling power to the camera and/or the microphone.

The result of the camera being enabled may be a live video or still image feed that is immediately enacted and recorded, and which may be streamed to a remote source. There are instances when a user of the computing device may desire to have the camera/microphone immediately disabled or physically blocked to protect ones privacy from both video and audio being recorded. Manual efforts to block the camera or turn off video/audio controls may be time consuming and cumbersome.

SUMMARY OF THE APPLICATION

One example embodiment may provide an apparatus that includes a camera housing, a camera disposed inside the camera housing, a shutter track disposed adjacent the camera inside the camera housing, and a movable shutter on the camera track, and the movable shutter includes an open portion and a closed portion and a knob which extends beyond a surface area of the camera housing to control movement of the movable shutter along the shutter track.

Another example embodiment may include an apparatus that includes a camera housing, a camera disposed inside the camera housing, a movable shutter disposed in front of the camera, a sensor configured to sense a condition, and a switch coupled to a power supply and configured to enact movement commands of the movable shutter when a sensed condition is detected via the sensor.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
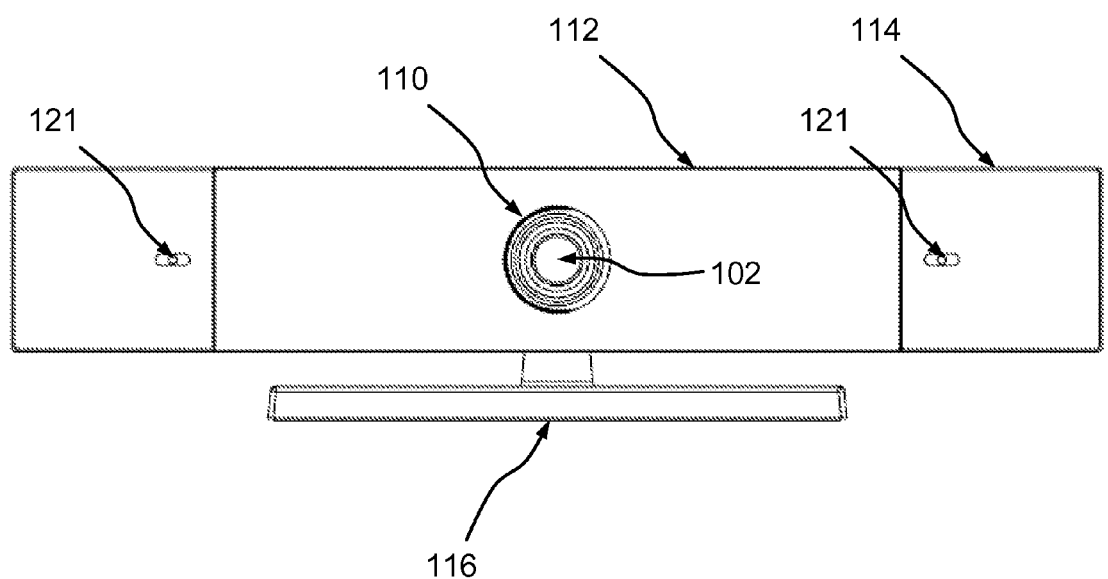
FIG. 1 illustrates a front view of a computer camera controller and blocking configuration in an open non-blocking shutter position according to an example embodiment of the present application.

FIG. 1 illustrates a front view of a computer camera controller and blocking configuration in an open non-blocking shutter position according to an example embodiment of the present application. Referring to FIG. 1, the camera configuration 100 includes a stand 116 which may support the camera housing 114. A stand-alone camera may be an accessory or peripheral device, however, the camera may also be integrated into the camera portion of a computing device (e.g., laptop, tablet, smartphone, personal computer, etc.). For example, the camera may be set along a top portion of the computing device as an add-on after-market device or as an integrated internal configuration. The camera lens 102 is shown in the middle of the shutter 110 illustrated in an open position. A protective film or glass layer 112 may be placed over the camera and shutter assembly to protect the camera.

Figure 3:
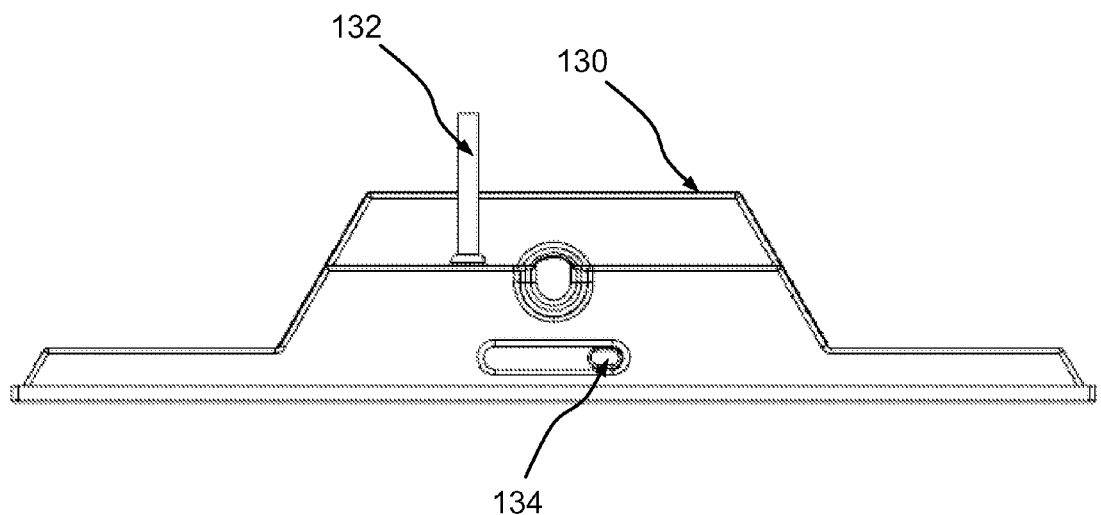
FIG. 3 illustrates a top view of a computer camera controller and blocking configuration in an open non-blocking shutter position according to an example embodiment of the present application.

According to example embodiments, the shutter 110 may be activated and de-activated automatically and/or via manually via user interaction with a shutter movement control knob (see FIG. 3). The knob and shutter movement may be manually activated/de-activated by a user. Sliding the shutter 110 from side-to-side using the switch/arm or knob manually may open or close the shutter to permit/block the camera to capture video and/or images.

Figure 2:
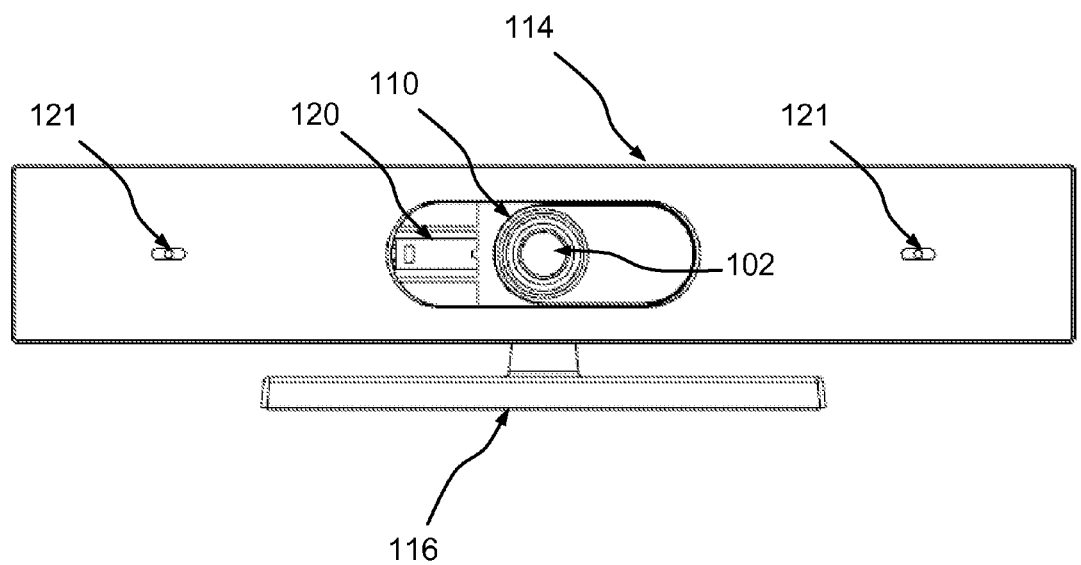
FIG. 2 illustrates a front view of a computer camera controller and blocking configuration in an open non-blocking shutter position with the cover removed according to an example embodiment of the present application.

One example configuration of FIG. 2 may include a camera housing 114, a camera 102 disposed inside the camera housing, a shutter track 120 disposed adjacent the camera 102 inside the camera housing, and a movable shutter 110 movable on the camera track 120. The shutter includes an open portion, which the camera may obtain access to record, and a closed portion which blocks the camera's view, and a knob (see FIG. 3) which extends beyond a surface area of the camera housing to control movement of the shutter 110 along the shutter track 120. The camera housing may also have a protective shield 112 disposed over the camera 102 and the shutter 110 extending along a majority of a length of the camera housing 114.

The protective shield may be glass or plastic and may be a mesh net or other material. The knob is accessible via an open slot in a top portion of the camera housing. A power source may be included inside the housing along with a switch controller, memory and a power supply. Sensors may be part of the housing or may be separate and wired to the switch for sensory control (e.g., sound, voice recognition commands, light, audio, etc.). The power supply is configured to power the camera, the switch and even the shutter in an automated embodiment of FIG. 10. The auxiliary sensor is in communication with the switch, and a sensed condition (e.g., audio, light, etc.) triggers the switch to power on the camera. An auxiliary sensor (not shown) may be in communication with the switch and a second sensed condition, such as the opposite of the first sensed condition or a different sensed condition triggers the switch to power off the camera.

A microphone or pair of microphones 121 are disposed inside the camera housing and are communicatively connected to the switch and powers source. An auxiliary sensor in communication with the switch may trigger the switch when the condition is sensed, and a first sensed condition triggers the switch to power off the microphone while a second sensed condition triggers the switch to power on the microphone.

The microphone may be de-activated and then activated by sliding the shutter closed which may trigger an optical sensor so the shutter will pass through a sensor field of view. This then signals the processor 1080 to disable the microphone input. The microphone and video functions can also be disabled by higher level applications (i.e. SKYPE) using a "mute" and "unmute" feature, provided the shutter is not closed.

FIG. 2 illustrates a front view of a computer camera controller and blocking configuration in an open non-blocking shutter position with the cover removed according to an example embodiment of the present application. Referring to FIG. 2, the configuration 200 illustrates the glass 112 removed exposing the shutter track 120.

FIG. 3 illustrates a top view of a computer camera controller and camera blocking configuration in an open non-blocking shutter position according to an example embodiment of the present application. Referring to FIG. 3, the configuration 300 illustrates the top portion of the housing with the manual shutter control knob 134 in an open position, In FIG. 6, the shutter 136 is in a partial blocking position, and in FIG. 9 the shutter 138 is in a fully closed position. The power line 132 feeds through the back of the housing to the power supply distribution unit inside the housing. The back of the housing 130 is wider to allow the components to fit inside the housing and to allow the power supply to vent and release heat from the power supply.

Figure 4:
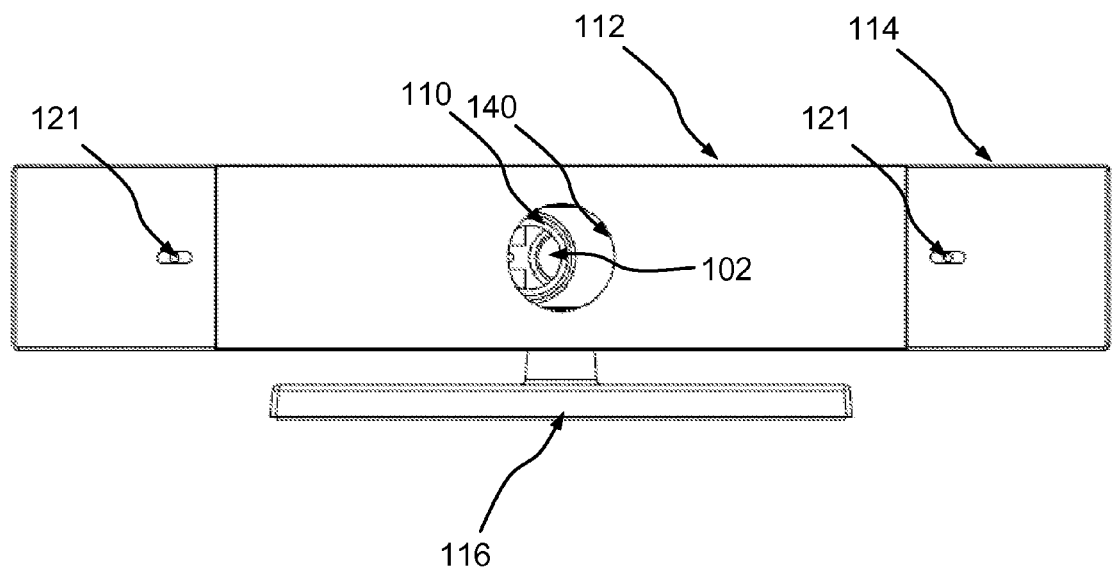
FIG. 4 illustrates a front view of a computer camera controller and blocking configuration in a partially open and partially blocking shutter position according to an example embodiment of the present application.

FIG. 4 illustrates a front view of a computer camera controller and blocking configuration in a partially open and partially blocking shutter position according to an example embodiment of the present application. Referring to FIG. 4, the configuration 400 includes an example where the shutter 110 is partially closed and is partially obstructing the view of the camera lens 102. The solid portion of the shutter 140 is in view in this configuration.

Figure 5:
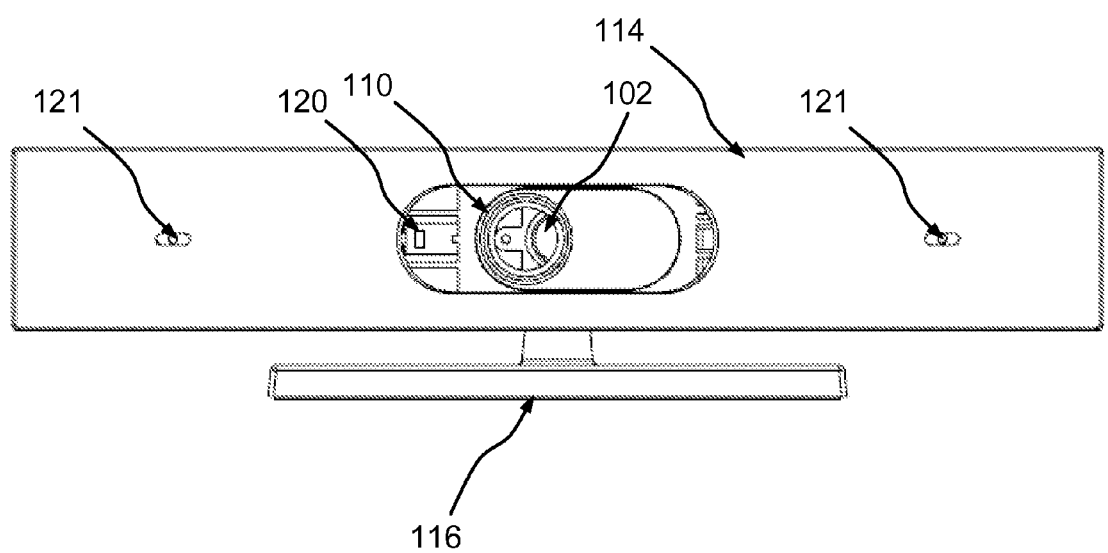
FIG. 5 illustrates a front view of a computer camera controller and blocking configuration in a partially open and partially blocking shutter position with the cover removed according to an example embodiment of the present application.

FIG. 5 illustrates a front view of a computer camera controller and blocking configuration in a partially open and partially blocking shutter position with the cover removed according to an example embodiment of the present application. Referring to FIG. 5, the configuration 500 includes the same partial overlapping position of the shutter 110 except the glass cover is not present to provide a more detailed view of the shutter track 120 and the shutter 110 in a partial blocking position.

Figure 6:
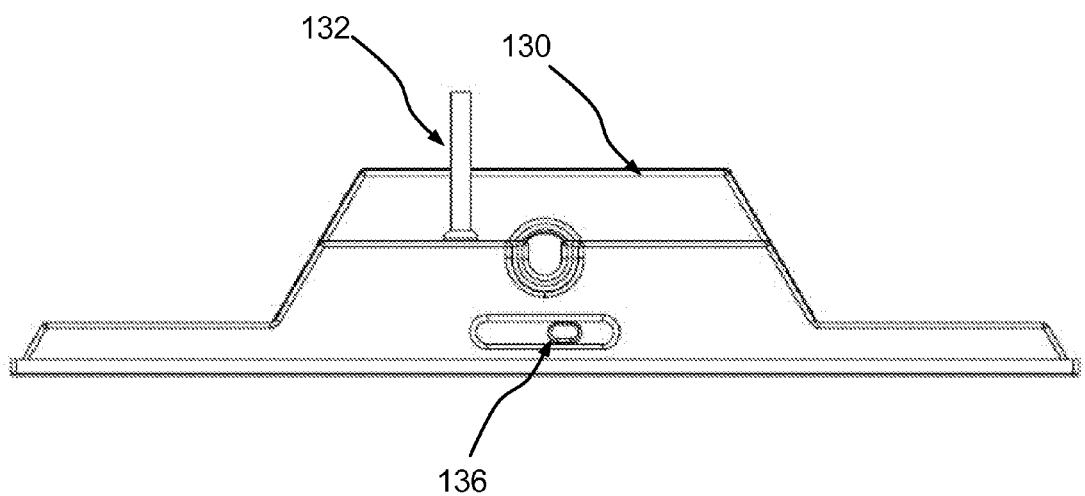
FIG. 6 illustrates a top view of a computer camera controller and blocking configuration in a partially open and partially blocking shutter position according to an example embodiment of the present application.

FIG. 6 illustrates a top view 600 of a computer camera controller and blocking configuration in a partially open and partially blocking shutter position according to an example embodiment of the present application. Referring to FIG. 6, the top view is substantially the same as FIG. 3, however, the shutter control knob 136 is in a partially closed/partially open position.

Figure 7:
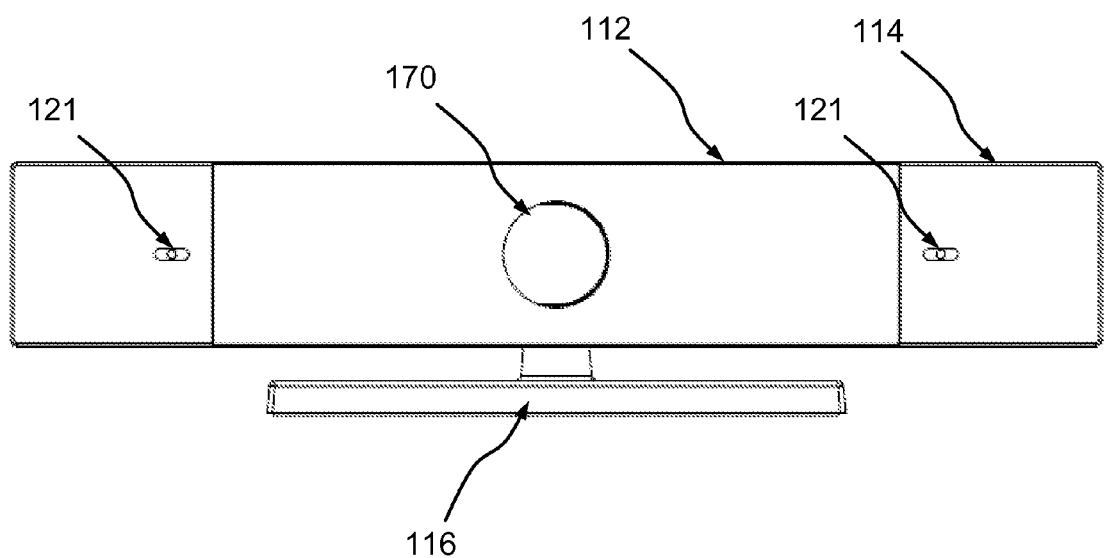
FIG. 7 illustrates a front view of a computer camera controller and blocking configuration in a blocked shutter position according to an example embodiment of the present application.

FIG. 7 illustrates a front view of a computer camera controller and blocking configuration in a blocked shutter position according to an example embodiment of the present application. Referring to FIG. 7, the configuration 700 includes the shutter being in a fully closed position 170 thus blocking the camera's view.

Figure 8:
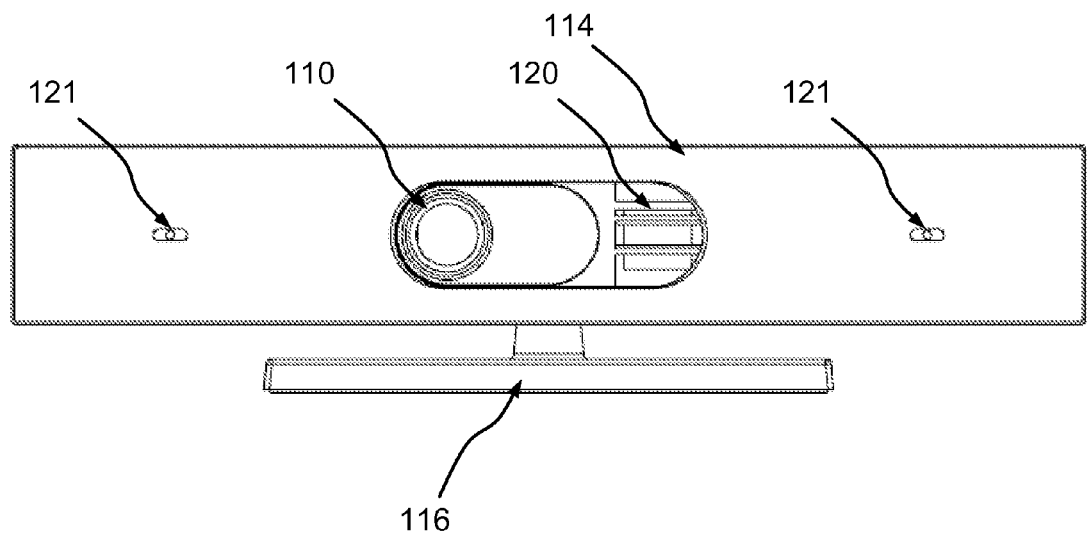
FIG. 8 illustrates a front view of a computer camera controller and blocking configuration in a blocked shutter position with the cover removed according to an example embodiment of the present application.

FIG. 8 illustrates a front view of a computer camera controller and blocking configuration in a blocked shutter position with the cover removed according to an example embodiment of the present application. Referring to FIG. 8, the configuration 800 includes the camera being in a fully closed position without the glass cover 112.

Figure 9:
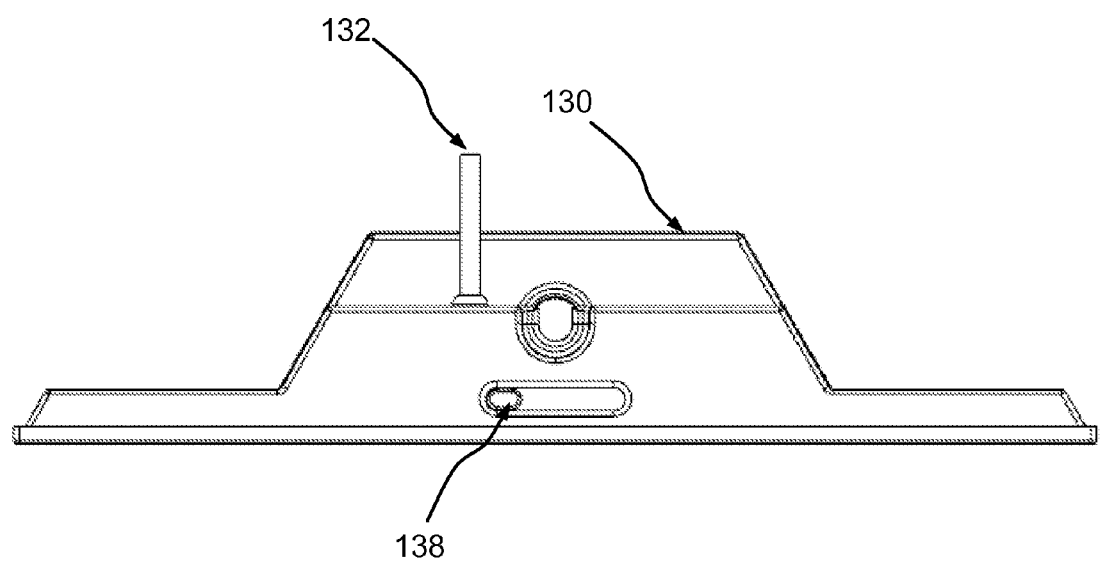
FIG. 9 illustrates a top view of a computer camera controller and blocking configuration in a blocked shutter position according to an example embodiment of the present application.

FIG. 9 illustrates a top view of a computer camera controller and blocking configuration in a blocked shutter position according to an example embodiment of the present application. Referring to FIG. 6, the top view is substantially the same as FIG. 3, however, the shutter control knob 138 is in a closed position.

Figure 10:
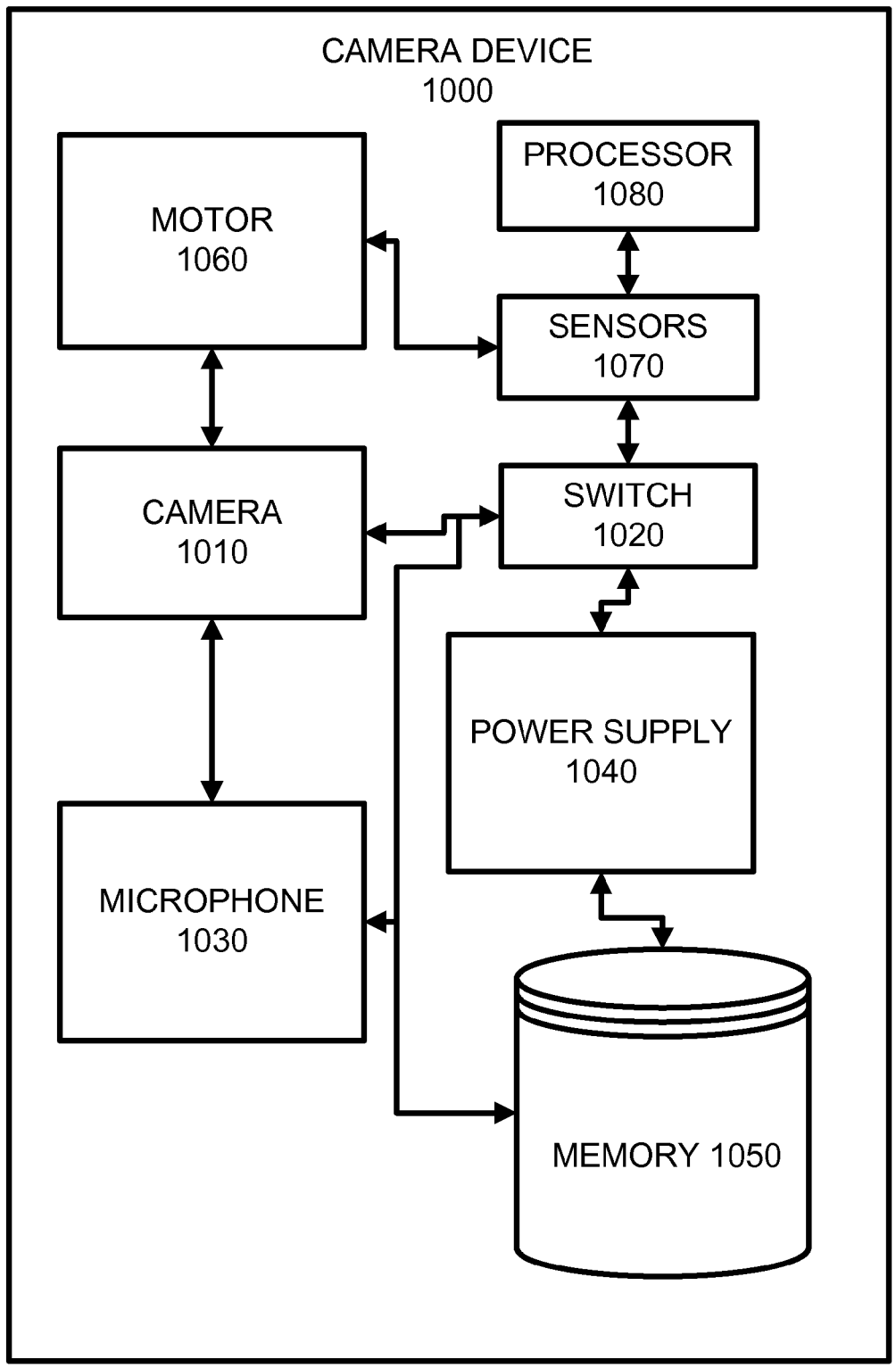
FIG. 10 illustrates an automated camera control device module configuration according to example embodiments.

FIG. 10 illustrates a camera device configuration 1000 according to another example embodiment. Referring to FIG. 10, the camera 1010 is in communication with a motor 1060, switch 1020, sensors 1070, a power supply 1040, a microphone 1030, a memory 1050 and a processor 1080.

According to example embodiments, the microphone 121 could be turned off by a verbal command received (e.g., On, Off, Record, Stop, Save, etc.) via an audio sensor 1070 and an added speech recognition program stored in memory 1050 and processed by processor 1080. This configuration also permits the shutter to be turned on manually or automatically by the motor control 1060 attached to the shutter which is enabled by the switch 1020 providing power to the motor 1060 when the proper signal is received by the sensors 1070. The motor may be affixed to the shutter via an actuation arm that moves back and forth with the movement of the motor.

A video processing application could be enabled by the processor 1080 to send the camera or microphone an "Off" command upon receipt of a specific image, and a separate camera would be used to pick up the "on" image and trigger a USB command to the standalone camera to turn the video back to the "on" status. The camera would include certain specifications including but not limited to a resolution: 1080p30, an output format: H.264, MJPEG, a digital zoom: 4x, a field of view: 120°, microphone: dual microphone with beam forming, an interface: USB 2.0 (UAC/UVC), device compatibility: Enzo, WINDOWS 7, WINDOWS 8, Mac OS X. The external interfaces may include a USB cable that is used to connect the webcam to a PC or related device. There is also a single white LED indicator that is used to indicate that the camera is actively capturing video and/or that the microphone is capturing audio and/or that the microphone and/or camera have been disabled. The camera may be powered via its USB connection or another power supply source. In another example, the camera unit will have a flexible mounting system that includes a removable mounting bracket. The mounting bracket may facilitate mounting above or below a display and also includes threads for a tripod mount.

Although an exemplary embodiment of the system, method, and device of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 10 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications thereto.

What is claimed is:

1. An apparatus comprising:
a camera housing;
a camera disposed inside the camera housing;
a shutter track disposed adjacent the camera inside the camera housing;
a power source communicatively connected to the camera and configured to power the camera;
a switch coupled to the power source and the camera, and configured to control a power on and a power off status of the camera;
an auxiliary sensor in communication with the switch, wherein a sensed light condition triggers the switch to perform a power on to the camera and an opposite sensed light condition triggers the switch to perform a power off to the camera;
a microphone communicatively connected to the power source;
a processor communicatively connected to the microphone; and
a movable shutter included within the camera housing and comprising
an open portion,
a closed portion, and
a knob which extends beyond a surface area of the camera housing to control movement of the movable shutter along the shutter track;
wherein the movable shutter movement enables an optical sensor to signal the processor to activate the microphone when the movable shutter is slid open and to deactivate the microphone when the movable shutter is slid closed.

2. The apparatus of claim 1, further comprising:
a protective shield disposed over the camera and the movable shutter extending along a majority of a length of the camera housing.

3. The apparatus of claim 2, wherein the protective shield comprises at least one of glass and plastic.

4. The apparatus of claim 1, wherein the knob is accessible via an open slot in a top portion of the camera housing.

5. An apparatus comprising:
a camera housing;
a camera disposed inside the camera housing;
a movable shutter disposed in front of the camera;
an audio sensor configured to sense a condition;
a motor attached to the movable shutter and configured to control movement of the movable shutter via an actuation arm affixed to the motor and the movable shutter, wherein the movable shutter is movable via a shutter track disposed adjacent the camera inside the camera housing;
an optical sensor disposed on the shutter track;
a switch coupled to a power supply and the camera, and configured to perform a power on to the camera and to perform a power off to the camera;
a microphone disposed inside the camera housing and communicatively connected to the switch,
wherein the movable shutter movement enables the optical sensor to signal a processor to activate the microphone when the movable shutter is slid open and to deactivate the microphone when the movable shutter is slid closed.

6. The apparatus of claim 5, further comprising:
a protective shield disposed over the camera and the movable shutter extending along a majority of a length of the camera housing.

7. The apparatus of claim 6, wherein the protective shield comprises at least one of glass and plastic.

8. The apparatus of claim 5, wherein the processor is configured to process a voice control algorithm, the audio sensor is configured to sense an audible voice command, and the processor is further configured to process the audible voice command and open the movable shutter.

9. The apparatus of claim 5, wherein the processor is configured to process a voice control algorithm, the audio sensor is configured to sense an audible voice command, and the processor is further configured to process the audible voice command and close the movable shutter.

\* \* \* \* \*